United States Patent
Blinzler et al.

(10) Patent No.: US 7,906,609 B2
(45) Date of Patent: *Mar. 15, 2011

(54) METHOD FOR PRODUCING POLYOXYMETHLENES

(75) Inventors: Marko Blinzler, Mannheim (DE); Knut Zöllner, Mannheim (DE); Claudius Schwittay, Heidelberg (DE); Jens Assmann, Mannheim (DE)

(73) Assignee: BASF AG, Ludwigshafen (DE)

( * ) Notice: Subject to any disclaimer, the term of this patent is extended or adjusted under 35 U.S.C. 154(b) by 529 days.

This patent is subject to a terminal disclaimer.

(21) Appl. No.: 11/996,235

(22) PCT Filed: Jul. 13, 2006

(86) PCT No.: PCT/EP2006/064175
§ 371 (c)(1),
(2), (4) Date: Jan. 18, 2008

(87) PCT Pub. No.: WO2007/009925
PCT Pub. Date: Jan. 25, 2007

(65) Prior Publication Data
US 2008/0207865 A1    Aug. 28, 2008

(30) Foreign Application Priority Data
Jul. 20, 2005   (DE) .................... 10 2005 034 490

(51) Int. Cl.
*C08G 2/10* (2006.01)
*C08G 2/06* (2006.01)
*C08G 2/00* (2006.01)

(52) U.S. Cl. ...... 528/230; 528/425; 528/480; 528/502 R

(58) Field of Classification Search ............ 528/230, 528/425, 480, 502 R
See application file for complete search history.

(56) References Cited

U.S. PATENT DOCUMENTS

| 5,144,005 A | 9/1992 | Sextro et al. |
| 5,608,030 A | 3/1997 | Hoffmockel et al. |
| 5,844,059 A | 12/1998 | Yamamoto et al. |
| 2003/0018104 A1 | 1/2003 | Mours et al. |

FOREIGN PATENT DOCUMENTS

| BE | 702357 | 2/1968 |
| CN | 1398273 A | 2/2003 |
| DE | 10 2004 057 867.2 | 6/2006 |
| DE | 10 2005 012 482.8 | 9/2006 |
| EP | 0 629 644 | 12/1994 |
| JP | 11060663 A | 3/1999 |
| JP | 11255853 A | 9/1999 |
| JP | 11279245 A | 10/1999 |
| WO | WO-0158974 A1 | 8/2001 |
| WO | WO-2005/012380 | 2/2005 |

OTHER PUBLICATIONS

Claims 1-6 and 8-20 of U.S. Appl. No. 11/908,729.*
Claims 14-33 of U.S. Appl. No. 11/720,414.*

* cited by examiner

*Primary Examiner* — Duc Truong
(74) *Attorney, Agent, or Firm* — Connolly Bove Lodge & Hutz LLP

(57) ABSTRACT

Process for preparing polyoxymethylene copolymers (POMs) by a) polymerizing a reaction mixture comprising suitable main monomers and comonomers and also a polymerization initiator and, if appropriate, a regulator, b) adding a deactivator and c) removing the residual monomers, wherein the amount of compounds whose melting point at 1013 hPa is below 60° C. present in the reaction mixture at any point in time during the process is not more than 0.1% by weight, with the POM, the monomers, comonomers, polymerization initiators, deactivators and regulators not being included in the calculation.

16 Claims, No Drawings

METHOD FOR PRODUCING POLYOXYMETHYLENES

CROSS REFERENCE TO RELATED APPLICATIONS

This application is a National Phase filing under 35 U.S.C. §371 of PCT/EP2006/064175 filed Jul. 13, 2006, which claims priority to Patent Application No. 102005034490.9, filed in Germany on Jul. 20, 2005. The entire contents of each of the above-applications are incorporated herein by reference.

The invention relates to a process for preparing polyoxymethylene copolymers (POMs) by a) polymerizing a reaction mixture comprising suitable main monomers and comonomers and also a polymerization initiator and, if appropriate, a regulator, b) adding a deactivator and c) removing the residual monomers, wherein the amount of compounds whose melting point at 1013 hPa is below 60° C. present in the reaction mixture at any point in time during the process is not more than 0.1% by weight, with the POM, the monomers, comonomers, polymerization initiators, deactivators and regulators not being included in the calculation.

The invention further relates to a process for preparing polyoxymethylene copolymers (POMs), which comprises preparing the polymers by means of the first-mentioned process and then adding d) customary additives.

The invention also relates to the polyoxymethylene copolymers obtainable by means of the two processes.

Polyoxymethylene polymers (POMs, also referred to as polyacetals) are obtained by polymerization of 1,3,5-trioxan (trioxane for short) or another formaldehyde source, with comonomers such as 1,3-dioxolane, 1,3-butanediol formal or ethylene oxide being used for the preparation of copolymers. The polymerization is usually carried out cationically; for this purpose, strong protic acids, for example perchloric acid, or Lewis acids such as tin tetrachloride or boron trifluoride are introduced into the reactor as initiators (catalysts). The reaction is subsequently usually stopped by addition of ammonia, amines, alkali metal alkoxides or other basic deactivators.

The conversion in the polymerization is usually not complete; rather, the crude POM polymer still comprises up to 40% of unreacted monomers. Such residual monomers are, for example, trioxane and formaldehyde and also any comonomers used. The residual monomers are separated off in a degassing apparatus. It would be economically advantageous for them to be recirculated directly and without further purification operations to the polymerization.

Solvents are usually concomitantly used in the preparation of POMs. For example, initiator and activator are generally added in diluted form in a solvent, since otherwise the small amount required cannot be metered precisely and/or cannot be distributed uniformly in the content of the reactor or in the reaction mixture.

The solvents or other additives can either accumulate when the residual monomers which have been separated off are recirculated and can interfere in the process as a result of this accumulation, or can remain in their entirety or at least in residual amounts in the polymer and adversely affect moldings produced therefrom as a result of migration, sweating-out or formation of coatings. In addition, the polymerization can be adversely affected by secondary reactions.

The patent BE 702 357 proposes adding the initiator boron trifluoride as a solution in a cyclic formal such as 1,3-dioxolane, i.e. the comonomer, in the preparation of trioxane copolymers. The catalyst is deactivated by subsequent treatment of the crude polymer with water or basic compounds.

According to Derwent abstract No. 1999-629313/54 of JP 11279245, a trioxane copolymer is prepared by adding a mixture of boron trifluoride in 1,3-dioxolane to trioxane, the initiator is deactivated by treating the POM with aqueous triethylamine solution and the POM is washed and dried.

The Derwent abstracts No. 1999-585962/50 of JP 11255853 and 99-226243/19 of JP 11060663 disclose similar processes but do not describe the deactivation in any detail.

According to the German patent application No. 102004057867.2 of Nov. 30, 2004, page 10, lines 27-39, which is not a prior publication, the deactivator is added as a solution in trioxane, dioxolane or another monomer or in a carrier substance such as oligomeric or polymeric POM. However, according to page 6, lines 9-15, the catalyst is added as solution in a solvent, for example in cyclohexane or 1,4-dioxane.

The German patent application No. 102005012482.8 of Mar. 16, 2005, which is not a prior publication, describes a process for preparing POMs, in which the amount of proton donors is less than 5000 ppm. According to page 6, lines 5 to 12, the initiator is added in diluted form in a solvent.

Accordingly, either the initiator (catalyst) or the deactivator is added using a solvent in the processes mentioned. A completely solvent-free process is not described.

It was an object of the invention to remedy the disadvantages indicated. In particular, an improved process for preparing POMs is to be provided. In the process, the residual monomers which have been separated off should preferably be able to be recirculated to the polymerization directly and without further purification.

We have accordingly found the process defined at the outset and the polymers mentioned at the outset. Preferred embodiments of the invention are defined in the subordinate claims. All pressures indicated are absolute pressures.

Polyoxymethylene Copolymers

The polyoxymethylene copolymers (POMs) as such are known and commercially available. They are usually prepared by polymerization of trioxane as main monomer; in addition, comonomers are concomitantly used. The main monomers are preferably selected from among trioxane and other cyclic or linear formals or other formaldehyde sources.

The term main monomers is intended to indicate that the proportion of these monomers in the total amount of monomers, i.e. the sum of main monomers and comonomers, is greater than the proportion of the comonomers in the total amount of monomers.

Such POM polymers quite generally have at least 50 mol % of recurring units —$CH_2O$— in the main polymer chain. Suitable polyoxymethylene copolymers are, in particular, ones which comprise not only the recurring units —$CH_2O$— but also up to 50 mol %, preferably from 0.01 to 20 mol %, in particular from 0.1 to 10 mol % and very particularly preferably from 0.5 to 6 mol %, of recurring units

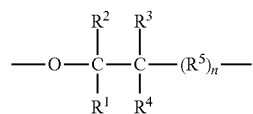

where $R^1$ to $R^4$ are each, independently of one another, a hydrogen atom, a $C_1$-$C_4$-alkyl group or a halogen-substituted alkyl group having from 1 to 4 carbon atoms and $R^5$ is a —$CH_2$— group, a —$CH_2O$— group, a $C_1$-$C_4$-alkyl- or $C_1$-$C_4$-haloalkyl-substituted methylene group or a corresponding oxymethylene group and n is in the range from 0 to 3. These groups can advantageously be introduced into the copolymers by ring opening of cyclic ethers. Preferred cyclic ethers are those of the formula

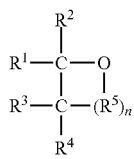

where $R^1$ to $R^5$ and n are as defined above. Purely by way of example, mention may be made of ethylene oxide, 1,2-propylene oxide, 1,2-butylene oxide, 1,3-butylene oxide, 1,3-dioxane, 1,3-dioxolane and 1,3-dioxepane (=butanediol formal, BUFO) as cyclic ethers and linear oligoformals or polyformals such as polydioxolane or polydioxepane as comonomers. 1,3-Dioxolane is a particularly preferred comonomer.

Likewise suitable are oxymethylene terpolymers which are prepared, for example, by reaction of trioxane, one of the above-described cyclic ethers and a third monomer, for example bifunctional compounds of the formula

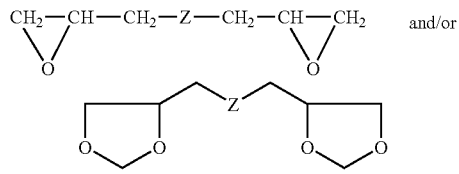

where Z is a chemical bond, —O—, —ORO— (R=$C_1$-$C_8$-alkylene or $C_3$-$C_8$-cycloalkylene).

Preferred monomers of this type are ethylene diglycide, diglycidyl ether and diethers derived from glycidyls and formaldehyde, dioxane or trioxane in a molar ratio of 2:1 and also diethers derived from 2 mol of a glycidyl compound and 1 mol of an aliphatic diol having from 2 to 8 carbon atoms, for example the diglycidyl ethers of ethylene glycol, 1,4-butanediol, 1,3-butanediol, cyclobutane-1,3-diol, 1,2-propanediol and cyclohexane-1,4-diol, to name only a few examples.

End-group-stabilized polyoxymethylene polymers which have predominantly C—C or —O—$CH_3$ bonds at the ends of the chain are particularly preferred.

The preferred polyoxymethylene copolymers have melting points of at least 150° C. and molecular weights (weight average) $M_w$ in the range from 5000 to 300 000, preferably from 7000 to 250 000. Particular preference is given to POM copolymers having a polydispersity ($M_w/M_n$) of from 2 to 15, preferably from 2.5 to 12, particularly preferably from 3 to 9. The measurements are generally carried out using gel permeation chromatography (GPC)/SEC (size exclusion chromatography), and the $M_n$ value (number average molecular weight) is generally determined by means of GPC/SEC.

Regulators and Initiators

The molecular weights of the polymer can, if appropriate, be set to the desired values by means of the regulators customary in trioxane polymerization and by means of the reaction temperature and residence time. Possible regulators are acetals and formals of monohydric alcohols, the alcohols themselves and the small amounts of water which function as chain transfer agents and Whose presence can generally never be completely avoided. The regulators are used in amounts of from 10 to 10 000 ppm, preferably from 20 to 5000 ppm. Methylal and butylal are preferred regulators.

The polymerization is preferably initiated cationically. Polymerization initiators (also referred to as catalysts) used are the cationic initiators customary in trioxane polymerization. Suitable initiators are protic acids such as fluorinated or chlorinated alkylsulfonic and arylsulfonic acids, e.g. perchloric acid, trifluoromethanesulfonic acid, or Lewis acids such as tin tetrachloride, arsenic pentafluoride, phosphorus pentafluoride and boron trifluoride and also complexes and salt-like compounds derived therefrom, e.g. boron trifluoride etherate and triphenylmethylene hexafluorophosphate. Preference is given to using protic acids as polymerization initiator. Particular preference is given to perchloric acid.

The initiators (catalysts) are used in amounts of from about 0.01 to 500 ppmw (parts per million by weight), preferably from 0.01 to 200 ppmw and in particular from 0.01 to 100 ppmw, based on the monomers used. It is generally advisable to add the initiator in diluted form in order to be able to meter the abovementioned small amounts of initiator precisely and be able to distribute them homogeneously.

In a preferred embodiment, the initiator is added to the reaction mixture without concomitant use of solvents. Such solvents which are preferably not used would be, for example, aliphatic or cycloaliphatic hydrocarbons, e.g. cyclohexane, 1,4-dioxane, halogenated aliphatic hydrocarbons, glycol ethers such as triglyme (triethylene glycol dimethyl ether), cyclic carbonates such as propylene carbonate or lactones such as gamma-butyrolactone.

The initiator is particularly preferably dissolved in a partial amount of the comonomers or in the total amount of the comonomers and the initiator solution obtained is added to the reaction mixture. Particular preference is given to using a partial amount and not the total amount of the comonomers, with this partial amount preferably being from 0.1 to 80% by weight, in particular from 0.5 to 20% by weight, of the total amount of comonomers.

Accordingly, the polymerization initiator is preferably added to the reaction mixture as a solution in a partial amount or the total amount of the comonomers in the process of the invention. The concentration of the initiator in the initiator solution is generally from 0.005 to 5% by weight.

For the purposes of the present invention, the terms solution and dissolution encompass suspensions of and the suspension of sparingly soluble initiators.

Main monomers and comonomers, initiators and, if appropriate, regulators can be introduced into the polymerization reactor in any desired premixed form or separately from one another. Furthermore, the components can comprise sterically hindered phenols as described in EP-A 129369 or EP-A 128739 to stabilize them.

Deactivators

After the polymerization, the polymerization mixture is deactivated, preferably without a phase change occurring. The deactivation of the initiator residues (catalyst residues) is effected by addition of a deactivator (terminating agent) to the reaction mixture.

Suitable deactivators are, for example, ammonia and primary, secondary or tertiary, aliphatic and aromatic amines, e.g. trialkylamines such as triethylamine, or triacetone-diamine. Likewise suitable are basic salts such as sodium carbonate and borax, also the carbonates and hydroxides of the alkali and alkaline earth metals. Further suitable deactivators are organic compounds of the alkali and alkaline earth metals.

Such organic compounds are, in particular, salts of aliphatic, cycloaliphatic, araliphatic or aromatic carboxylic acids which preferably have up to 30 carbon atoms and from 1 to 4 carboxyl groups. Examples of well-suited compounds are sodium acetate, propionate, butyrate, oxalate, malonate and succinate. Further preferred deactivators are alkali metal alkyls or alkaline earth metal alkyls which have from 2 to 30 carbon atoms in the alkyl radical. Particularly preferred metals are Li, Mg and Na, with particular preference being given to n-butyllithium.

Likewise preferred deactivators are alkali metal or alkaline earth metal alkoxides, in particular ones having from 1 to 15, in particular from 1 to 8, carbon atoms. Sodium alkoxides are preferred; preference is given to using sodium methoxide, sodium ethoxide or sodium glyconate.

The deactivators are usually added to the polymers in amounts of, for example, from 0.01 ppmw to 2% by weight, preferably from 0.05 ppmw to 0.5% by weight and in particular from 0.1 ppmw to 0.1% by weight. In general, it is advisable to add the deactivator in diluted form in order to be able to meter the small amounts of deactivator mentioned precisely and distribute them uniformly.

In a preferred embodiment, the deactivator is added to the reaction mixture without concomitant use of solvents. Such solvents which are preferably not used would be, for example, water, methanol, other alcohols or other organic solvents.

Particular preference is given to dissolving the deactivator in a carrier substance having ether structural units and adding the deactivator solution obtained to the reaction mixture. Preferred carrier substances are ones which have the same structural units as are present in the POM polymer to be prepared in the particular case. Suitable carrier materials are, in particular, the abovementioned main monomers or comonomers and also oligomeric to polymeric polyoxymethylene and other polyacetals.

For the purposes of the present invention, the terms solution or dissolution encompass suspensions of and the suspension of sparingly soluble deactivators. The term solution also encompasses an oligomer or polymer melt.

If main monomers are used for preparing the deactivator solution, a partial amount of the total main monomers used in the process is employed. This partial amount is usually from 0.01 to 10% by weight, preferably from 0.1 to 5% by weight, of the total amount of main monomers. If comonomers are used for the deactivator solution, use is likewise made of a partial amount of the total amount of comonomers, and this is generally from 0.01 to 95% by weight, preferably from 0.1 to 50% by weight.

If oligomeric or polymeric POM is used for preparing the deactivator solution, it is possible to use, for example, a masterbatch comprising oligomeric or polymeric POM and usually from 0.01 ppmw to 5% by weight, preferably from 0.1 ppmw to 1% by weight, of the deactivator.

The preferred addition of the deactivator in liquid form is carried out, for example, at temperatures of from 140 to 220° C. If oligomeric or polymeric polyoxymethylenes are used as carrier substances, addition in liquid form at temperatures of from 160 to 220° C. is likewise preferred. Such polyoxymethylenes functioning as carrier substance can, if appropriate, comprise customary additives. To meter such melts of the carrier substances comprising the deactivators, preference is given to using apparatuses such as side extruders, stuffing screws, melt pumps, mixing pumps, etc.

Accordingly, the deactivator is preferably added to the reaction mixture as a solution in a partial amount of the main monomers or the comonomers or as a solution in an oligomeric or polymeric POM in the process of the invention. The concentration of the deactivator in the deactivator solution (carrier substance) is preferably from 0.001 to 10% by weight, more preferably from 0.01 to 5% by weight, in particular from 0.05 to 2% by weight, very particularly preferably from 0.08 to 1% by weight.

Way of Carrying Out the Polymerization

POMs derived from formaldehyde can be prepared in a customary fashion by polymerization in the gas phase, in solution, by precipitation polymerization or in bulk. POMs derived from trioxane are generally obtained by bulk polymerization, for which purpose it is possible to use any reactors having a good mixing action. The reaction can be carried out homogeneously, e.g. in a melt, or heterogeneously, e.g. as a polymerization to form a solid or pelletized solid. Suitable reactors are, for example, pan reactors, plowshare mixers, tube reactors, List reactors, kneaders (e.g. Buss kneaders), extruders having, for example, one or two screws and stirred reactors, with the reactors being able to be equipped with static or dynamic mixers.

In a bulk polymerization, e.g. in an extruder, a melt seal to the extruder intake can be produced by molten polymer, as a result of which volatile constituents remain in the extruder. The main monomers and comonomers are metered into the polymer melt present in the extruder, either together with or separately from the initiators (catalysts), at a preferred temperature of the reaction mixture of from 62 to 114° C. The monomers (trioxane) are preferably also introduced in the molten state, e.g. at from 60 to 120° C.

Melt polymerization is generally carried out at from 1.5 to 500 bar and from 1.30 to 300° C., and the residence time of the polymerization mixture in the reactor is usually from 0.1 to 20 minutes, preferably from 0.4 to 5 minutes. The polymerization is preferably carried out to a conversion of above 30%, e.g. from 60 to 90%.

In each case, a crude POM which comprises, as mentioned, considerable proportions, for example up to 40%, of unreacted residual monomers, in particular trioxane and formaldehyde, is obtained. Formaldehyde can be present in the crude POM even when only trioxane has been used as monomer, since it can be formed as degradation product of trioxane. In addition, other oligomers of formaldehyde, e.g. the tetramer tetroxane, can also be present.

Preference is given to using trioxane as monomer for the preparation of the POM, which is why the residual monomers also comprise trioxane, usually together with from 0.5 to 10% by weight of tetroxane and from 0.1 to 75% by weight of formaldehyde.

The residual monomers are removed from the crude POM. This is usually effected in a degassing apparatus; suitable degassing apparatuses are, for example, degassing pots (flash pots), vented extruders having one or more screws, filmtruders, thin film evaporators, spray dryers, stream degassers and other customary degassing apparatuses. Preference is given to using vented extruders or degassing pots. The latter are particularly preferred.

Degassing can be carried out in a single stage (in a single degassing apparatus). It can likewise be carried out in a plurality of stages, for example two stages, in a plurality of degassing apparatuses. In the case of multistage degassing, the degassing apparatuses can be identical or different in terms of type and size. Preference is given to using two different degassing pots connected in series, with the second pot having a smaller volume.

In single-stage degassing, the pressure in the degassing apparatus is usually from 0.1 mbar to 10 bar, preferably from 1 mbar to 2 bar and particularly preferably from 5 mbar to 800 mbar, and the temperature is generally from 100 to 260° C., preferably from 115 to 230° C. and in particular from 150 to 210° C. In the case of two-stage degassing, the pressure in the first stage is preferably from 0.1 mbar to 10 bar, in particular from 0.5 mbar to 8 bar and particularly preferably from 1 mbar to 7 bar, and that in the second stage is preferably from 0.1 mbar to 5 bar, in particular from 0.5 mbar to 2 bar and particularly preferably from 1 mbar to 1.5 bar. The temperature in two-stage degassing generally does not differ significantly from the temperatures mentioned for single-stage degassing.

The residence time of the polymer in the degassing apparatus is generally from 0.1 sec to 30 min, preferably from 0.1 sec to 20 min. In the case of multistage degassing, these times apply to a single stage.

The residual monomers liberated during degassing are separated off as a vapor stream. Regardless of the way in which degassing is carried out (single-stage or multistage, degassing pots or vented extruders, etc.), the residual monomers are usually selected from among trioxane, formaldehyde, tetraoxane, 1,3-dioxolane, 1,3-dioxepane, ethylene oxide and oligomers of formaldehyde.

The residual monomers which have been separated off (vapor stream) are taken off in a customary manner. They can be condensed, for example in a falling film condenser or other customary condensers, and recirculated to the polymerization. The ratio of trioxane to formaldehyde in the vapor stream can be varied by setting appropriate pressures and temperatures.

In the process of the invention, the amount of compounds whose melting point at 1013 hPa is below 60° C. present in the reaction mixture is not more than 0.1% by weight at any point in time during the process. This amount is preferably not more than 0.05% by weight. Preference is likewise given to the melting point of the compounds at 1013 hPa being below 25° C.

In the calculation of this amount, the POM, the monomers, comonomers, polymerization initiators, deactivators and regulators are not taken into account, but any solvents used in their addition or other additives are.

The term process refers to the totality of all process steps from the initial monomer mixture (i.e. before initiation of the polymerization) to the end of the removal of residual monomers (degassing). However, if additives are added to the POM after the removal of residual monomers, this addition of additives does not come within the scope of a process according to claims 1 to 10, i.e. it is possible in the addition of additives to add more than 0.1% by weight of compounds whose melting point at 1013 hPa is below 60° C. A process which includes the addition of additives is subject matter of claim 11.

The process according to claims 1 to 10, i.e. without taking additives into account, is particularly preferably carried out without concomitant use of solvents, i.e. it is "solvent-free".

Very particular preference is given to using only monomers, comonomers or POM, i.e. compounds which are in any case present in the reaction mixture, as diluent or carrier substance in the addition of initiator and deactivator.

Additives and Blending of the POM

The invention also provides a process for preparing polyoxymethylene copolymers (POMs), which comprises preparing the polymers by means of the process according to any of claims 1 to 10 and then adding d) customary additives. Accordingly, this process is made up of the first-mentioned process for the preparation of POMs and a subsequent addition of additives.

The addition of additives can be carried out with concomitant use of solvents or without solvents. Suitable additives are, for example:
talc,
polyamides, in particular copolyamides,
alkaline earth metal silicates and alkaline earth metal glycerophosphates,
esters or amides of saturated aliphatic carboxylic acids,
ethers derived from alcohols and ethylene oxide,
nonpolar polypropylene waxes,
nucleating agents,
fillers,
impact-modifying polymers, in particular polymers based on ethylene-propylene (EPM) or ethylene-propylenediene (EPDM) rubbers,
flame retardants,
plasticizers,
bonding agents,
dyes and pigments,
formaldehyde scavengers, in particular amine-substituted triazine compounds, zeolites or polyethylenimines,
antioxidants, in particular antioxidants having a phenolic structure, benzophenone derivatives, benzotriazole derivatives, acrylates, benzoates, oxanilides and sterically hindered amines (HALS=hindered amine light stabilizers).

These additives are known and are described, for example, in Gächter/Müller, Plastics Additives Handbook, Hanser Verlag Munich, 4th edition, 1993, reprint 1996.

The amount of additives depends on the additive used and the desired effect. The customary amounts are known to those skilled in the art. The additives are, if they are used, added in a customary way, for example individually or together, as such, as a solution or suspension or preferably as a masterbatch.

The finished POM molding composition can be produced in a single step by, for example, mixing the POM and the additives in an extruder, kneader, mixer or other suitable mixing apparatus with melting of the POM, discharging the mixture and subsequently usually pelletizing it. However, it has been found to be advantageous firstly to premix one or all of the components "cold" in a dry mixer or another mixing apparatus and, in a second step, to homogenize the resulting mixture with melting of the POM, if appropriate with addition of further components in an extruder or other mixing apparatus. In particular, it can be advantageous to premix at least the POM and the antioxidant (if used).

The extruder or the mixing apparatus can be provided with degassing facilities, for example to remove residual monomers or other volatile constituents in a simple manner. The homogenized mixture is discharged in a customary fashion and preferably pelletized.

The addition of additives can be made particularly mild by minimizing the time between discharge from the degassing apparatus and introduction into the mixing apparatus in which the additives are added. For this purpose, it is possible, for example, to mount the degassing pot directly on top of the intake of the extruder used for blending with the additives.

The polyoxymethylene copolymers obtainable by the process of the invention for preparing POMs (claims 1 to 10) or by the process of the invention for preparing POMs and adding additives (claim 11) are likewise subject matter of the invention. Moldings of all types can be produced from the copolymers.

As a result of the process of the invention being carried out in the presence of not more than 0.01% by weight of compounds having a melting point below 60° C. (1013 hPa) and preferably in the absence of solvents, it is possible to recirculate the residual monomers separated off in the degassing step directly and without further purification to the polymerization. Accumulation of additives in the recirculation of the residual monomers is avoided, as is sweating-out of additives from the finished molding. The occurrence of secondary reactions which could adversely affect the polymerization is reduced.

EXAMPLES

Perchloric acid in the form of a 0.01% strength by weight solution of 70% strength by weight aqueous perchloric acid in 1,3-dioxolane was used as initiator for the polymerization described below.

Sodium methoxide in the form of a masterbatch was used as deactivator. The masterbatch comprised a polymeric POM copolymer of trioxane and 3.5% by weight of butanediol formal (commercial product Ultraform® N 2320 from BASF) and 0.0021% by weight of sodium methoxide.

A monomer mixture consisting of 96.995% by weight of trioxane, 3% by weight of dioxolane and 0.005% by weight of methylal was fed continuously into a polymerization reactor at a rate of 5 kg/h. The reactor was a tube reactor provided with static mixers and was operated at 150° C. and 30 bar.

0.1 ppmw of perchloric acid as a solution in 1,3-dioxolane (see above) was mixed into the monomer stream as initiator. After a polymerization time (residence time) of 2 minutes, sodium methoxide (as masterbatch, see above) was metered and mixed into the polymer melt as deactivator in such an amount that it was present in a 10-fold molar excess relative to the initiator. The residence time in the deactivation zone was 3 minutes.

The polymer melt was taken off through a pipe and depressurized via a regulating valve into a first degassing pot which was operated at 190° C. and 3 bar. The vapor was taken off from the pot via a pipe and introduced into a falling film condenser where it was brought into contact with a trioxane feed at 118° C. and 3.5 bar. Part of the vapor was precipitated and the monomer mixture obtained was recirculated to the reactor. The proportion of the vapor which was not precipitated was fed via a pressure maintenance valve into an offgas line.

From the first degassing pot, the melt was taken off via a pipe and depressurized through a regulating valve into a second degassing pot which was provided with an offgas line. The temperature of the degassing pot was 190° C. and the pressure was ambient pressure. The pot had no bottom and was mounted directly on top of the feed dome of a twin-screw extruder ZSK 30 from Werner & Pfleiderer so that the degassed polymer fell directly from the pot onto the extruder screws.

The extruder was operated at 190° C. at a speed of rotation of the screws of 150 rpm and was provided with vents which were operated at 250 mbar. In addition, it had a feed opening for additives, through which 0.5 kg/h of the antioxidant ethylenebis-oxyethylene) bis[3-(5-tert-butyl-4-hydroxy-m-tolyl)propionate] (commercial product Irganox® 245 from Ciba Specialty Chemicals) were metered in. The product was discharged, cooled and pelletized in a customary way.

The example shows that 1,3-dioxolane, i.e. the comonomer, was used for the metered addition of the initiator. The deactivator was metered in as a solution in a POM.

The invention claimed is:
1. A process for preparing polyoxymethylene copolymers (POMs), carried out without the concomitant use of a solvent, which comprises:
   a) polymerizing a reaction mixture comprising suitable main monomers and comonomers and also a polymerization initiator and, if appropriate, a regulator;
   b) adding a deactivator; and
   c) removing the residual monomers, wherein the amount of compounds whose melting point at 1013 hPa is below 60° C. present in the reaction mixture at any point in time during the process is not more than 0.1% by weight, with the POM, the monomers, comonomers, polymerization initiators, deactivators and regulators not being included in the calculation, and
   d) the initiator is added as a solution in a partial or total amount of the comonomers; and
   e) the deactivator and the initiator are added to the reaction mixture as a solution in a partial amount of the main monomers or the comonomers or in an oligomeric or polymeric POM.

2. The process according to claim 1, wherein the melting point of the compounds at 1013 hPa is below 25° C.

3. The process according to claim 1, wherein the polymerization is initiated cationically.

4. The process according to claims 1, wherein protic acids are used as polymerization initiator.

5. The process according to claim 1, wherein the main monomers are selected from among trioxane and other cyclic or linear formals.

6. The process according to claim 1, wherein the concentration of the deactivator in the deactivator solution is from 0.001 to 10% by weight.

7. The process according to claim 2, wherein the polymerization is initiated cationically.

8. The process according to claim 2, wherein protic acids are used as polymerization initiator.

9. The process according to claim 3, wherein protic acids are used as polymerization initiator.

10. The process according to claim 2, wherein the main monomers are selected from among trioxane and other cyclic or linear formals.

11. The process according to claim 3, wherein the main monomers are selected from among trioxane and other cyclic or linear formals.

12. The process according to claim 4, wherein the main monomers are selected from among trioxane and other cyclic or linear formals.

13. The process according to claim 2, wherein the polymerization initiator is added to the reaction mixture without concomitant use of solvents.

14. The process according to claim 1, wherein d) the partial amount of comonomer is from 0.1 to 80% by weight of the total amount of commoner.

15. The process according to claim 1, wherein the concentration of the initiator in the initiator solution is from 0.005 to 5% by weight.

16. The process according to claim 1, wherein e) the deactivator is added as a solution in a partial amount or total amount of the main monomers of the comonomers or in an oligomeric polymeric POM.

* * * * *